US012362120B2

(12) United States Patent
Arciaga et al.

(10) Patent No.: US 12,362,120 B2
(45) Date of Patent: Jul. 15, 2025

(54) HIGH BREAKING CAPACITY FUSES WITH METAL REINFORCEMENTS

(71) Applicant: Littelfuse, Inc., Chicago, IL (US)

(72) Inventors: Marko Arciaga, Batangas (PH); Ralph Pechon Labonite, Lipa (PH); Lily Espenilla Rosios, Batangas (PH); Conrado Sagun De Leon, Laguna (PH); Albert Enriquez, Batangas (PH)

(73) Assignee: Littelfuse, Inc., Chicago, IL (US)

( * ) Notice: Subject to any disclaimer, the term of this patent is extended or adjusted under 35 U.S.C. 154(b) by 0 days.

(21) Appl. No.: 18/073,673

(22) Filed: Dec. 2, 2022

(65) Prior Publication Data

US 2024/0186096 A1 Jun. 6, 2024

(51) Int. Cl.

| | |
|---|---|
| ***H01H 85/041*** | (2006.01) |
| ***H01H 85/00*** | (2006.01) |
| ***H01H 85/06*** | (2006.01) |
| ***H01H 85/08*** | (2006.01) |
| ***H01H 85/17*** | (2006.01) |
| ***H01H 85/175*** | (2006.01) |

(52) U.S. Cl.

CPC ........ *H01H 85/0082* (2013.01); *H01H 85/06* (2013.01); *H01H 85/08* (2013.01); *H01H 85/17* (2013.01); *H01H 85/175* (2013.01); *H01H 2085/0412* (2013.01)

(58) Field of Classification Search

CPC ........... H01H 85/0082; H01H 85/0411; H01H 85/06; H01H 85/08; H01H 85/12; H01H 85/165–1755; H01H 2085/0412–0414

See application file for complete search history.

(56) References Cited

U.S. PATENT DOCUMENTS

| | | | | |
|---|---|---|---|---|
| 1,388,269 A * | 8/1921 | Kramer | H01H 85/044 337/237 |
| 3,848,215 A * | 11/1974 | Kozacka | H01H 85/165 337/248 |
| 4,680,567 A * | 7/1987 | Edwards | H01H 85/12 337/164 |
| 5,214,406 A * | 5/1993 | Reese | H01H 85/143 337/252 |
| 10,483,070 B1 * | 11/2019 | Beckert | H01H 69/02 |
| 2010/0090792 A1 * | 4/2010 | Whitney | H05K 3/3426 337/251 |

(Continued)

FOREIGN PATENT DOCUMENTS

| | | | | |
|---|---|---|---|---|
| EP | 1936652 A2 * | 6/2008 | H01H 85/157 |
| JP | 5027345 A | 10/2012 | |
| KR | 20160081064 A | 7/2016 | |

OTHER PUBLICATIONS

Bourlier, EP-1936652-A2, Translation (Year: 2008).*

Extended European Search Report for EP Application No. 23213790.1, dated Aug. 1, 2024, 10 pages.

*Primary Examiner* — Jacob R Crum

(74) *Attorney, Agent, or Firm* — KDW Firm PLLC

(57) ABSTRACT

A fuse includes a fuse body, two terminals, and a termination reinforcement. The fuse body surrounds a fusible element. The first terminal is located at one end of the fuse body and the second terminal is located at the other end of the fuse body. The fusible element is mechanically connected to the first and second terminals. The termination reinforcement is located at one end of the fuse body.

14 Claims, 9 Drawing Sheets

(56) References Cited

U.S. PATENT DOCUMENTS

| | | | | |
|---|---|---|---|---|
| 2017/0236675 | A1* | 8/2017 | Aberin | H01H 85/165 337/159 |
| 2019/0214208 | A1* | 7/2019 | Galla | H01C 7/02 |
| 2020/0161068 | A1* | 5/2020 | Enriquez | H01H 69/02 |
| 2020/0234906 | A1* | 7/2020 | Rosios | H01H 85/175 |
| 2022/0208500 | A1* | 6/2022 | Park | H01H 85/175 |

* cited by examiner

HIGH BREAKING CAPACITY FUSES WITH METAL REINFORCEMENTS

FIELD OF THE DISCLOSURE

Embodiments of the present disclosure relate to fuses and, more particularly, to the manufacture of fuses with high breaking capacity.

BACKGROUND

Wire-in-air (WIA) fuses utilize printed circuit board (PCB) technology in their design. FR4 layers, which are typical for PCBs, are coupled with epoxy layers to form a housing around a fusible element. Split-body fuses are those with housing which consists of at least two portions surrounding the fusible element. The housing is typically made of plastic or ceramic but may be made of other materials. Fuses may be of the through-hole type, which include terminals that fit into the PCB, or surface mount, in which the terminals are flat to be soldered to a pad on the PCB.

All fuses are rated to have a particular breaking capacity. Because of the multiple connected layers forming the fuse body, the layers of a WIA fuse may break apart if the fuse receives a current exceeding its breaking capacity. Similarly, the multiple parts making up a split-body fuse may break apart under these conditions. As the housing parts of a WIA or split-body fuse explode, the result may be unwanted debris, smoke, or even fire.

WIA and split-body fuses are ubiquitous in electronic devices of all types. Because of their popularity, customers are demanding such fuses to have higher breaking capacities than are currently available.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a fuse in accordance with the present disclosure may include a fuse body, two terminals, and a termination reinforcement. The fuse body surrounds a fusible element. The first terminal is located at one end of the fuse body and the second terminal is located at the other end of the fuse body. The fusible element is mechanically connected to the first and second terminals. The termination reinforcement is located at one end of the fuse body.

Another exemplary embodiment of a fuse in accordance with the present disclosure may include a fusible element, a terminal, and a termination reinforcement. The fusible element is located within a fuse body consisting of a top cover and a bottom cover. The terminal is mechanically connected to the fusible element and is partially within and partially outside one side of the fuse body. The terminal is bent two times. The first time, the terminal forms a first portion and a second portion where the second portion is perpendicular to the first portion. The second time, the terminal forms a third portion which is perpendicular to the second portion and parallel to the first portion. The termination reinforcement partially surrounds the fuse body at the one side.

DETAILED DESCRIPTION

Various embodiments of high-breaking capacity fuses are disclosed. The fuses are surface mount types, with some being wire-in-air and some being split-body designs. The fuses feature termination reinforcements, which may consist of slotted rings, whole (unslotted) rings, and adhesive conductive tape, disposed at both ends of the fuse body. The fuses also include terminals which are wrapped around the ends of the fuse body. Coupled with the terminals, the termination reinforcements increase the breaking capacity, amperage rating, the $I^2t$ parameter of the fuse, as compared to a similar fuse lacking these features.

For the sake of convenience and clarity, terms such as "top", "bottom", "upper", "lower", "vertical", "horizontal", "lateral", "transverse", "radial", "inner", "outer", "left", and "right" may be used herein to describe the relative placement and orientation of the features and components, each with respect to the geometry and orientation of other features and components appearing in the perspective, exploded perspective, and cross-sectional views provided herein. Said terminology is not intended to be limiting and includes the words specifically mentioned, derivatives therein, and words of similar import.

Figure 1A:
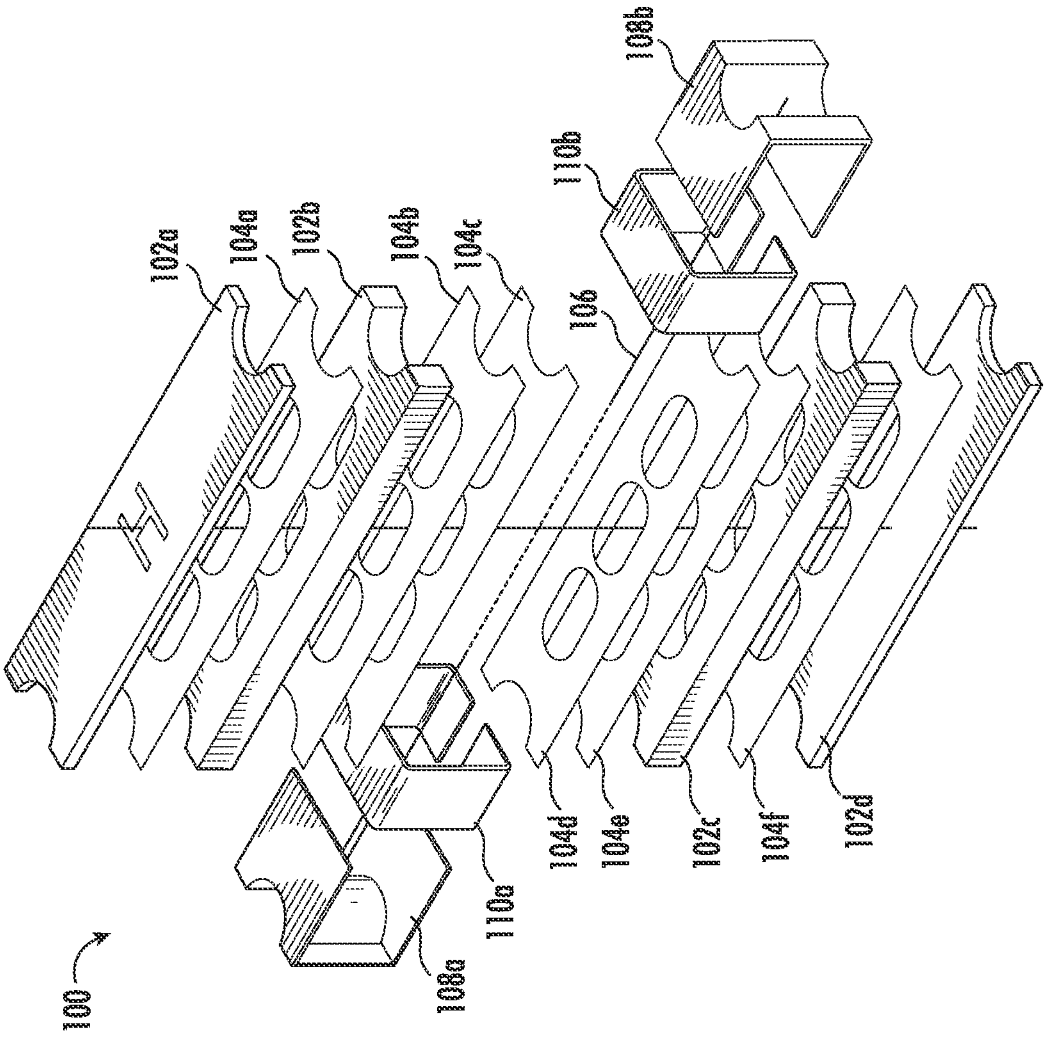
FIGS. 1A-1C are diagrams illustrating a high breaking capacity fuse, in accordance with exemplary embodiments.
Figure 1C:
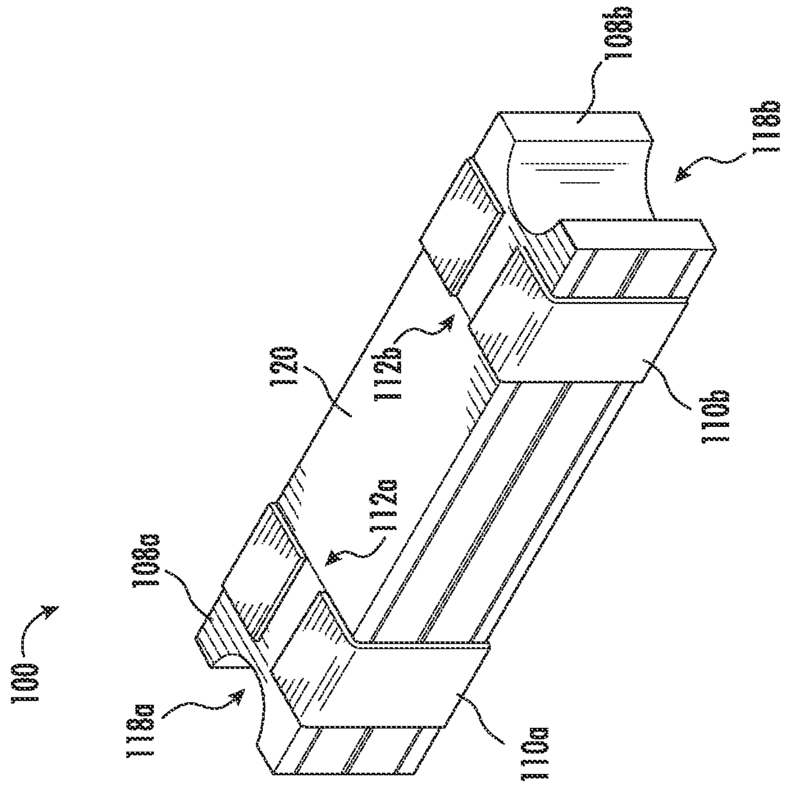
Figure 1B:
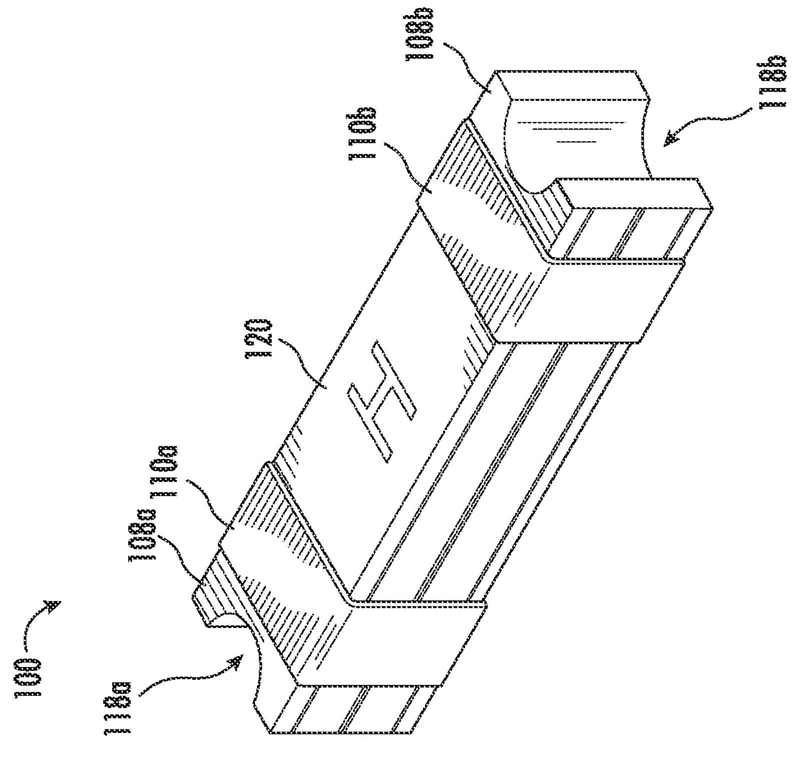

FIGS. 1A-1C are representative drawings of a fuse 100 with a high breaking capacity, according to exemplary embodiments. FIG. 1A is an exploded perspective view, FIG. 1B is a top perspective view, and FIG. 1C is a bottom perspective view of the exemplary fuse 100. In exemplary embodiments, the fuse 100 is a surface-mount fuse. Further, the fuse 100 is a wire-in-air (WIA) type of fuse which features alternating layers of FR4 (the preferred material for printed circuit boards) and epoxy.

In the exploded view of FIG. 1A, a top portion of the fuse 100 consists of a top FR 4 layer **102*a*, an epoxy layer 104*a*, a mid-top FR4 layer 102*b*, a second epoxy layer 104*b*, a third epoxy layer 104*c*, and a fusible element 106 (wire); a bottom portion of the fuse 100 consists of a fourth epoxy layer 104*d*, a fifth epoxy layer 104*e*, a mid-bottom FR4 layer 102*c*, a sixth epoxy layer 104*f* (collectively, "epoxy layer(s) 104"), and a bottom FR4 layer 102*d* (collectively, "FR4 layer(s) 102"). The sandwiched layers, of which there are at least two portions but typically more, are press-fit together to form a fuse body 120, as shown in FIGS. 1B and 1C, with each epoxy layer 104 having an adhesive quality that promotes affixation of the layers to one another. The fuse body 120, which is essentially the "housing" of the fuse 100, may be further protected with a coating, a sleeve, or other means (not shown), which has the effect of encapsulating the FR4 102 and epoxy 104 layers and further encapsulating the fusible element 106**.

In a non-limiting example, the mid-top 102*b* and mid-bottom 102*c* FR4 layers are thicker than the top FR4 102*a* and bottom FR4 102*d* layers and the number and arrangement of the FR4 102 and epoxy layers 104 may be different from the illustration. Further, in a non-limiting example, the fusible element 106 is shown as a single, linear wire but may consist of multiple wires with varying shapes disposed inside the fuse body 120, such as serpentine, spiral, coiled, and other symmetric or non-symmetric shapes.

In exemplary embodiments, the fuse 100 features castellations 118*a* and 118*b* (collectively, "castellation(s) 118"), which are half-circle-shaped indentations on either side of the fuse body 120. Accordingly, the FR4 layers 102 and epoxy layers 104 feature the half-circle-shapes such that, when the layers are connected to one another, the castellations 118 shown in FIGS. 1B and 1C form the resulting half-circle shapes.

In exemplary embodiments, the fuse 100 features a pair of terminals 108*a* and 108*b* as well as a pair of termination reinforcements 110*a* and 110*b* (collectively, "terminal(s) 108" and "termination reinforcement(s) 110"), disposed at either end of the fuse body 120. In exemplary embodiments, the terminals 108 are plated with nickel and tin. The fusible element 106 connects at one end to the terminal 108*a* and at a second, opposite end and to the terminal 108*b*, with the connections being made using a soldering paste. Because the terminals 108 are metal, an electrical connection (current path) is enabled through the terminals 108 and the fusible element 106 to pads on the PCB once the fuse 100 is soldered thereto. The terminals 108 are rectangular-cubed shaped with the end region forming a half-circle shape, so as to maintain the castellations 118 of the fuse 100. Where the fuse 100 is alternatively made up of FR4 and epoxy layers having no castellations, the terminals 108 may likewise be shaped without the half-circle shapes.

In some embodiments, where the fusible element 106 is a wire, the fusible element is intentionally made longer than the length of the fuse body, with each terminal 108 having a receiving hole through which the wire extends. The epoxy layers 104 are soft and conform to the wire. By having the wire extend and protrude beyond the castellations, the nickel and tin plating of the terminals 108 mechanically and electrically connect the fusible element 106 to the terminals, without need of any soldering paste.

The terminals 108 are structurally designed to cover a top surface of the end of the fuse body 120, a bottom surface of the end of the fuse body, and the side of the fuse body. Viewed from the side, the terminals 108 are approximately C-shaped, with the portion covering the top and bottom surfaces being horizontally disposed and the portion covering the side being vertically disposed, and thus perpendicular to the top and bottom surfaces.

In some embodiments, the termination reinforcements 110 are slotted metal rings. In other embodiments, the termination reinforcements 110 are full rings (entirely surrounding the circumference of the fuse body 120). In yet another embodiment, the termination reinforcements 110 are adhesive conductive tape. The termination reinforcements 110 thus at least partially surround the FR4 layers, the epoxy layers 104, and the terminals 108 of the fuse 100, thus reinforcing the affixation of the layers to one another. Where the termination reinforcements 110 are metal rings, the metal rings may be crimped, welded, or force-fitted to the fuse body 120. In exemplary embodiments, the termination reinforcements 110 conform well with the shape of the fuse body 120, and provide structure to the fuse 100, thus preventing the FR4 layers from delaminating during short circuit tests.

In exemplary embodiments, the terminal 108*a* is attached to one end of the fuse body 120, followed by the attachment of the termination reinforcement 110*a* over the terminal; similarly, the terminal 108*b* is attached to the other end of the fuse body 120, followed by the attachment of the termination reinforcement 110*b* over the terminal. In addition to termination reinforcements 110 made up of slotted metal rings, full metal rings, conductive adhesive tape, or other structural element, the terminals 108 also contribute to the structural reinforcement of the ends of the fuse 100.

FIG. 1B is a top perspective view and FIG. 1C is a bottom perspective view of the fuse 100. In some embodiments, the termination reinforcements 110 are slotted metal rings. Visible on the bottom side of the fuse 100, the termination reinforcements 110 each have a slot, with termination reinforcements 110*a* having slot 112*a* and termination reinforcements 110*b* having slot 112*b* (collectively, "slot(s) 112"), such that the metal rings do not entirely surround the fuse body 120. Thus, although the termination reinforcements 110 are sized to fit circumferentially around the fuse body 120, the slots 112 enable some flexion as the rings are positioned around the fuse body. In exemplary embodiments, the slots 112 are disposed on the bottom side of the fuse 100, with the bottom side being soldered to a PCB.

Fuses are designed such that the fusible element inside the fuse breaks as a result of an overcurrent event, known hereinafter as an abnormal event. Fuses are selected according to a number of different parameters, such as amperage rating, voltage rating, current rating, thermal energy, and breaking capacity. A fuse having a breaking capacity of 50A@125 VDC, for example, means that, when a 125V power supply is issued to the circuit including the fuse, if a short circuit of up to 50 amps occurs, the fusible element will break, but will do so safely, without other parts of the fuse, such as the housing, exploding. The breaking capacity of a fuse thus ensures that undesirable events, such as the fuse catching fire, are avoided. WIA fuses, such as the fuse 100, have at least two portions, but typically multiple connected layers forming the fuse body. If the circuit receives a current exceeding the amperage stated in the breaking capacity specification, the layers of the fuse body may break apart, which is considered an unsafe event for the fuse.

Another fuse parameter, the available thermal energy of a fuse resulting from current flow, is known as $I^2t$. The $I^2t$ parameter consists of melting, arcing, and total clearing $I^2t$. The $I^2t$ parameter has two important applications to fuse selection, pulse cycle withstand capacity and selective coordination.

In exemplary embodiments, the termination reinforcements 110, whether they be slotted metal rings, full metal rings, conductive adhesive tape, or some other structural element located at the terminals 108 of the fuse 100, prevent the many layers forming the fuse body 120 from breaking apart during the abnormal event, where the fuse body consists of at least two portions that have been affixed to one another. The addition of the termination reinforcements 110 thus enables the fuse 100 to have a higher breaking capacity than a similar fuse having no termination reinforcements. In exemplary embodiments, the fuse 100 has a breaking capacity of 10 kA@1000 VDC.

Further, in exemplary embodiments, the presence of the termination reinforcements 110 of the fuse increases the $I^2t$ parameter of the fuse over a similar fuse having no termination reinforcements. The termination reinforcements 110 thus improve both the breaking capacity and the $I^2t$ parameters of the fuse 100.

In exemplary embodiments, the termination reinforcements 110 significantly prevent short circuit failures (e.g., body rupture and top blown off) by strongly holding together the multiple layers of the fuse construction. This gives higher breaking capacity performance to the fuse 100. The amperage rating of the fuse may also increase due to the presence of termination reinforcements 110. When the termination reinforcements 110 is a slotted metal ring, as shown in FIG. 1C, the metal ring is more flexible to adapt with size variation of the fuse. The slot portion is positioned at the bottom of the fuse so that the onboard solder will securely hold the metal ring to the PCB.

In some embodiments, the terminals 108 of the fuse 100 are tin-dipped, meaning that some or all of the terminals are dipped in a liquid tin solution. In exemplary embodiments, in addition to being nickel and tin coated, the subsequent tin dip of the terminals 108 creates a large volume of conductive joint for the fusible element 106 to the terminals, which improves reliability of the wire connection to the terminals. The tin dip further facilitates good solder filler height after mounting, in which the fuse resistance is shown to be stable after the reflow is performed three times, in some embodiments. In other embodiments, the terminals 108 are not tin-dipped, as the initial nickel and tin coating operations enable sufficient soldering of the terminals 108.

Figure 2C:
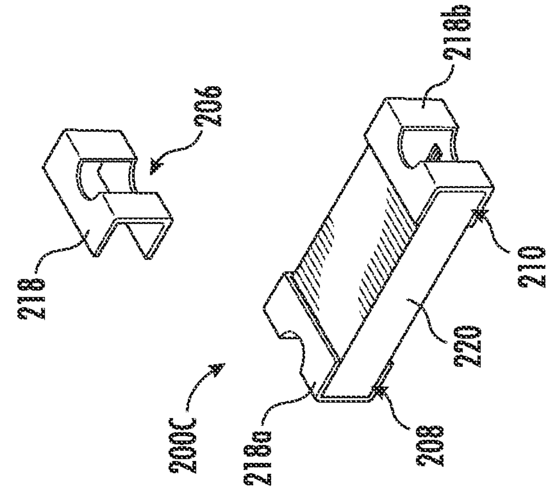
FIGS. 2A-2C are diagrams illustrating reinforcements for the high breaking capacity fuse of FIGS. 1A-1C, in accordance with exemplary embodiments.
Figure 2B:
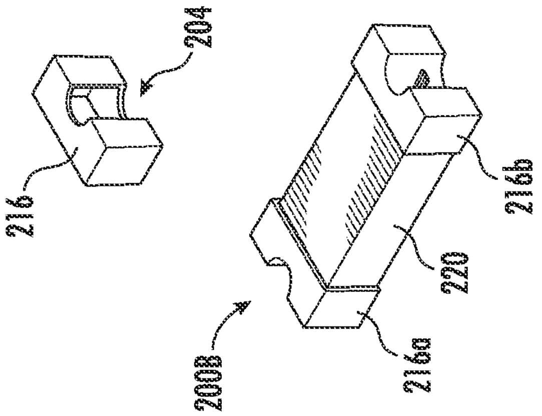
Figure 2A:
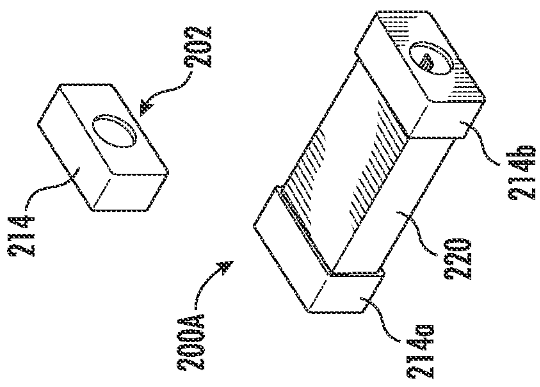

FIGS. 2A-2C are representative drawings of a fuse 200, according to exemplary embodiments. FIG. 2A shows a fuse 200A, FIG. 2B shows a fuse 200B, and FIG. 2C shows a fuse 200C (collectively, “fuse(s) 200”). In exemplary embodiments, the fuse 200 is also a surface mount fuse. The fuses 200 illustrate an alternative embodiment in which the terminals 108 and the termination reinforcements 110 of the fuse 100 are “combined” to form new termination reinforcement. In another embodiment, the termination reinforcements 110 are added over terminals that are not visible in the illustrations. Three types of termination reinforcement are shown: a metal cap with a hole (FIG. 2A), a metal cap with a slot (FIG. 2B), and a metal C-clip with a slot (FIG. 2C), which may be described as types of cap terminations. In exemplary embodiments, the metal used to create the termination reinforcements consists of plated metal. In some embodiments, the plated metal consists of brass or copper, while the plating layers can typically be copper flash, followed by nickel, with a final outer plating layer of tin, silver, or gold.

Like the terminals 108 of the fuse 100, the termination reinforcements of the fuse 200 are structurally designed to cover a top surface of the end of a fuse body 220, a bottom surface of the end of the fuse body, and the side of the fuse body. The termination reinforcements, as viewed from the side, are approximately C-shaped, with the portion covering the top and bottom surfaces being horizontally disposed and the portion covering the side being vertically disposed, and thus perpendicular to the top and bottom surfaces.

In exemplary embodiments, the fuse 200A consists of the fuse body 220 and a cap 214*a* disposed at one end of the fuse body and a cap 214*b* (collectively, “cap(s) 214”) disposed at a second, opposite end of the fuse body. In exemplary embodiments, the caps 214 are made of plated metal. The fuse body 220 may be a WIA-type fuse, such as the fuse 100 or another type of surface mount fuse. The caps 214 each feature a hole 202. In exemplary embodiments, the caps 214 are rectangular-cube shaped to be opened at one end (for sliding over the fuse body 220) and having the hole 202 at the other end, for connecting the fusible element (not shown) inside the fuse body 220 to a the cap 214, as the fusible element may, like the fusible element 106, extend beyond the length of the fuse body 220, with the fuse 200A being soldered to a solder pad on a PCB. Because the caps 214 are made using preferably plated metal, an electrical connection (current path) is enabled through the fusible element (not shown) of the fuse 200A to pads on the PCB.

In exemplary embodiments, the fuse 200B consists of the fuse body 220 and a cap 216*a* disposed at one end of the fuse body and a cap 216*b* (collectively, “cap(s) 216”) disposed at a second, opposite end of the fuse body. In exemplary embodiments, the caps 216 are made of plated metal. The caps 216 each feature a slot 204. In exemplary embodiments, the caps 216 are rectangular-cube shaped to be opened at one end (for sliding over the fuse body 220) and having the slot 204 at the other end. In exemplary embodiments, the slots 204 are half-circle-shaped indentations in the caps 216 which, when slid over the fuse body 220, enable the castellations to be maintained at each end of the fuse 200B. Further, like the holes 202, the slots 204 are open to enable a connection between the fusible element (not shown) inside the fuse body 220 and the cap 216, as the fusible element may, like the fusible element 106, extend beyond the length of the fuse body 220, with the fuse 200B being soldered to a solder pad on a PCB. Because the caps 216 are preferably made using plated metal, an electrical connection (current path) is enabled through the fusible element (not shown) of the fuse 200B to pads on the PCB.

In exemplary embodiments, the fuse 200C consists of the fuse body 220 and a C-clip 218*a* disposed at one end of the fuse body and a C-clip 218*b* (collectively, “C-clip(s) 218”) disposed at a second, opposite end of the fuse body. In exemplary embodiments, the C-clips 218 are made of plated metal. The C-clips 218 each feature a clip 206. In exemplary embodiments, the C-clips 218 are rectangular-cube shaped to be opened at one end (for sliding over the fuse body 220) and having the clip 206 at the other end. In contrast to the caps 214 and 216, the C-clips 218 are opened on opposite sides such that more of the fuse body 220 is visible (see, e.g., locations 208 and 210 in FIG. 2C). The C-clips 218 thus are made using less material than the caps 214 and 216. In some embodiments, the absence of metal on the sides of the C-clip 218, in addition to making the locations 208 and 210 of the fuse body 220 visible, also allow easier sliding of the C-clip over the fuse body 220 than is possible with the caps 214 and 216 because the C-clip can flex in conformance to the fuse body dimension.

Like the caps 214 and 216, the C-clips 218 include the open clips 206 for connecting the fusible element (not shown) inside the fuse body 220 to the C-clip 218, as the fusible element may, like the fusible element 106, extend beyond the length of the fuse body 220, with the fuse 200A being soldered to a solder pad on a PCB. Because the C-clips 218 are preferably made using plated metal, an electrical connection (current path) is enabled through the fusible element (not shown) of the fuse 200C to pads on the PCB.

The cap 214 with a hole 202, the cap 216 with a slot 204, and the C-clip 218 with a clip 206 are non-limiting examples of termination reinforcement of the fuse body 220. The C-clips 218, which use slightly less metal than the other embodiments, may be preferred for cost savings. The caps 216 may be preferred for fuses that have castellations. The examples of FIGS. 2A-2C are not meant to be limiting. The termination reinforcement provided by the cap 214, the cap 216, and the C-clip 218 provide both higher breaking capacity and increased $I^2t$ parameter of the fuses 200A-C over similar fuses having no termination reinforcement. In exemplary embodiments, the fuse 200 has a breaking capacity of 10 kA@1000 VDC.

Like the terminals 108 of the fuse 100, the caps 214 and 216 and the C-clips 218 may be tin dipped to improve the volume of conductive joint for the fusible element to the caps/clips, thus improving reliability of the fusible element connection to the terminals. The tin dip further facilitates good solder filler height after mounting.

Figure 3:
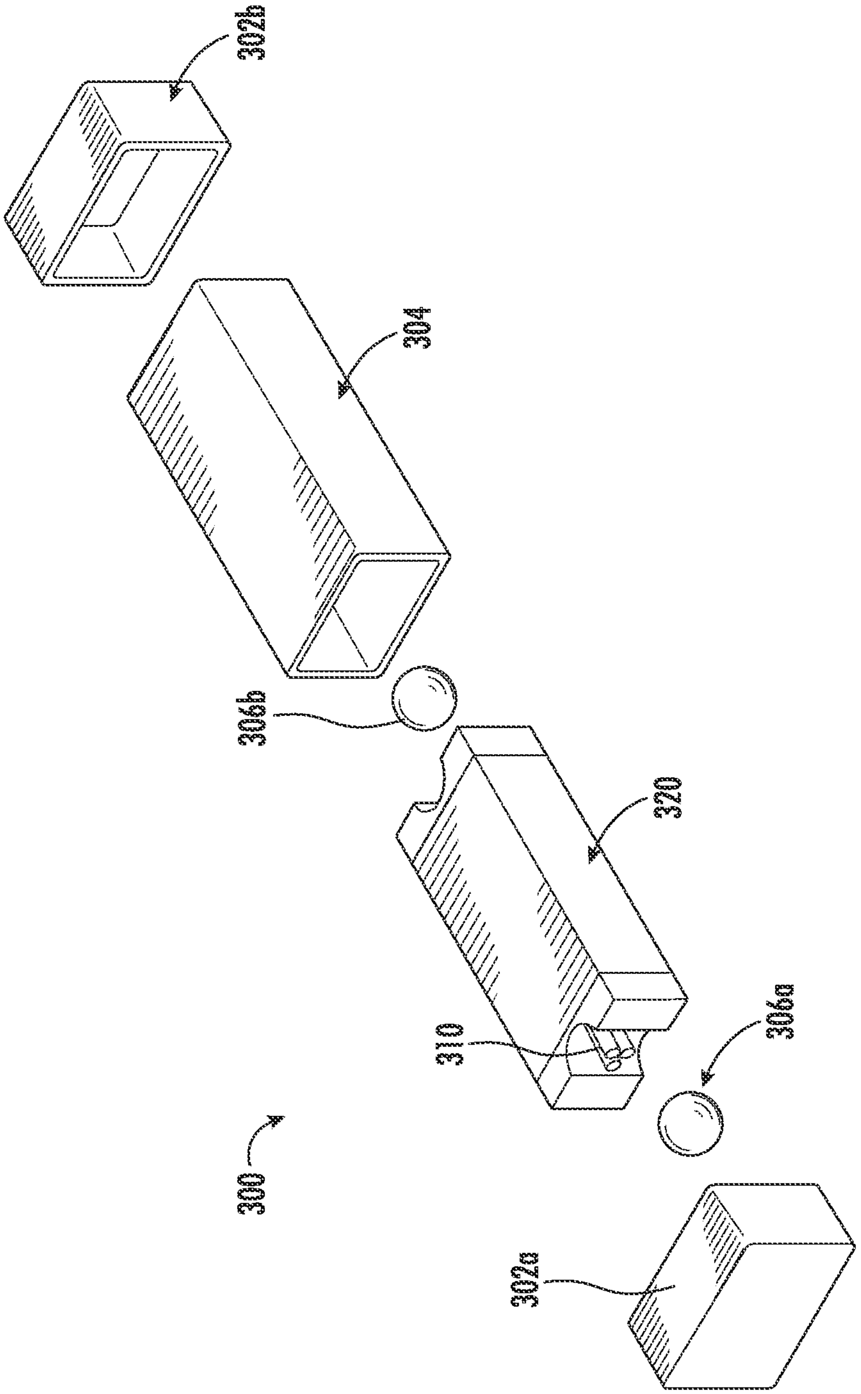
FIG. 3 is a diagram illustrating a high breaking capacity fuse, in accordance with exemplary embodiments.

FIG. 3 is a representative drawing of a fuse 300, according to exemplary embodiments. Like the fuses 100 and 200, the fuse 300 features termination reinforcement for a higher breaking capacity and $I^2t$ characteristics, in exemplary embodiments, than similar fuses with no termination reinforcement. The fuse 300 has a fuse body 320 that includes castellations. In some embodiments, the fuse body 320 is made up of multiple FR4 layers alternated with multiple epoxy layers to form a sandwich of layers affixed to one another (e.g., a WIA fuse).

The fuse 300 includes termination reinforcements 302*a* and 302*b* (collectively, "termination reinforcement(s) 302"), are of the cap variety (e.g., they "cap" the ends of the fuse body) and operate as both terminals and reinforcements. Like the terminals 108 of the fuse 100, the termination reinforcements 302 of the fuse 300 are structurally designed to cover a top surface of the end of the fuse body 320, a bottom surface of the end of the fuse body, and the side of the fuse body. Viewed from the side, the termination reinforcements 302 are approximately C-shaped, with the portion covering the top and bottom surfaces being horizontally disposed and the portion covering the side being vertically disposed, and thus perpendicular to the top and bottom surfaces.

The fuse 300 features a fusible element 310 made up of multiple parallel wires. In exemplary embodiments, the multi-wired fusible element 310 increased the $I^2t$ value of the fuse 300 over similar fuses having a single-wired fusible element. In exemplary embodiments, like the above-described caps 214, caps 216, and C-clips 218, the termination reinforcements 302 are a type of metal plated cap termination. The termination reinforcements 302 consist of rectangular-cube-shaped metal that is open at one end to permit sliding over the fuse body 320. Soldering paste 306*a* and 306*b* (collectively, "soldering paste 306") is used to connect each end of the fusible element 310 to respective termination reinforcements 302, which are then soldered to a PCB. Because the termination reinforcements 302 are preferably a plated metal, an electrical connection (current path) is enabled through the fuse 300 on the PCB.

The outer body 304 is designed to eliminate a top-blown rupture of the fuse body 320 during a short circuit failure. In exemplary embodiments, the outer body 304 is made of a heat-shrinkable tube, fiber glass, ceramic, plastic, or any type of encapsulating coating, such as an epoxy. In exemplary embodiments, the fuse 300 has a breaking capacity of 10 kA@ 1000 VDC.

Other advantages of the fuse 300 include an option to eliminate the wet processes after final assembly, which could resolve chemical seep and metallic contaminations issues (both of which pose reliability concerns), and reduction of manufacturing time and cost with marking, via formation and termination plating processes in panel form. In exemplary embodiments, the fuse 300 resembles a "Square Nano" fuse package design and is a lead-free design.

Figure 4A:
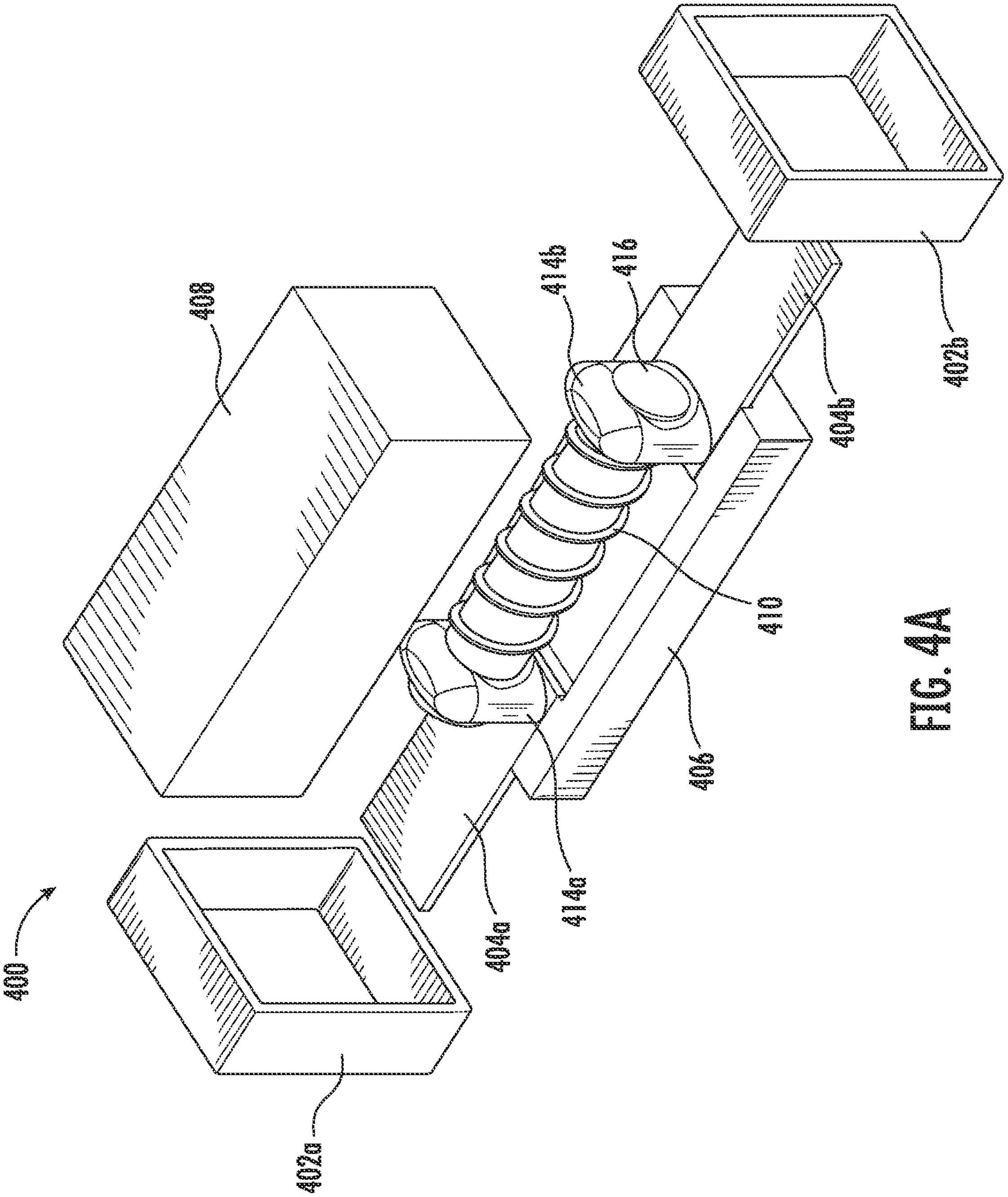
FIGS. 4A-4C are diagrams illustrating a high breaking capacity fuse, in accordance with exemplary embodiments.
Figure 4B:
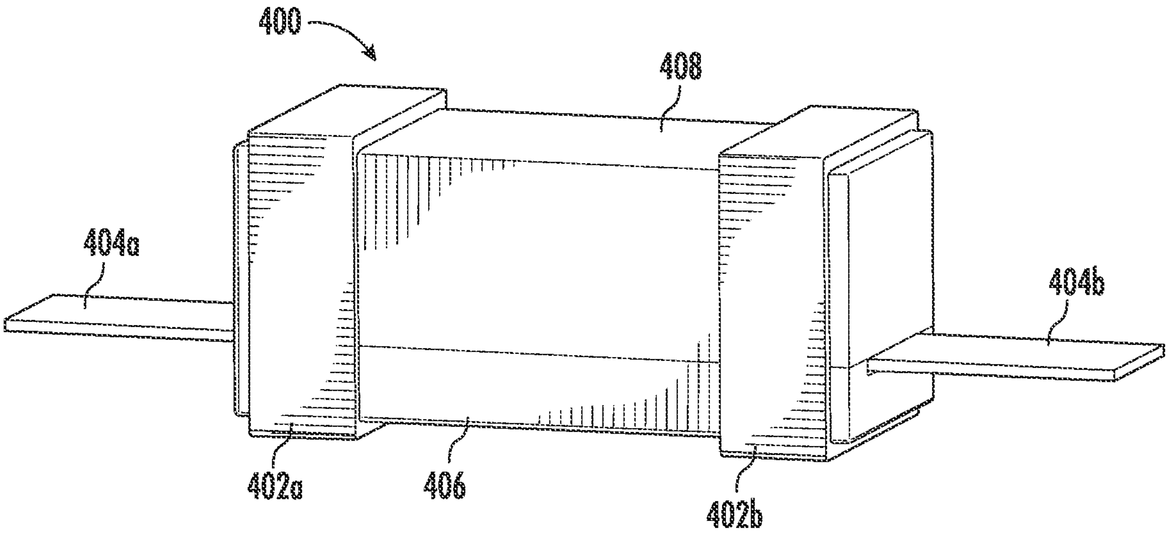
Figure 4C:
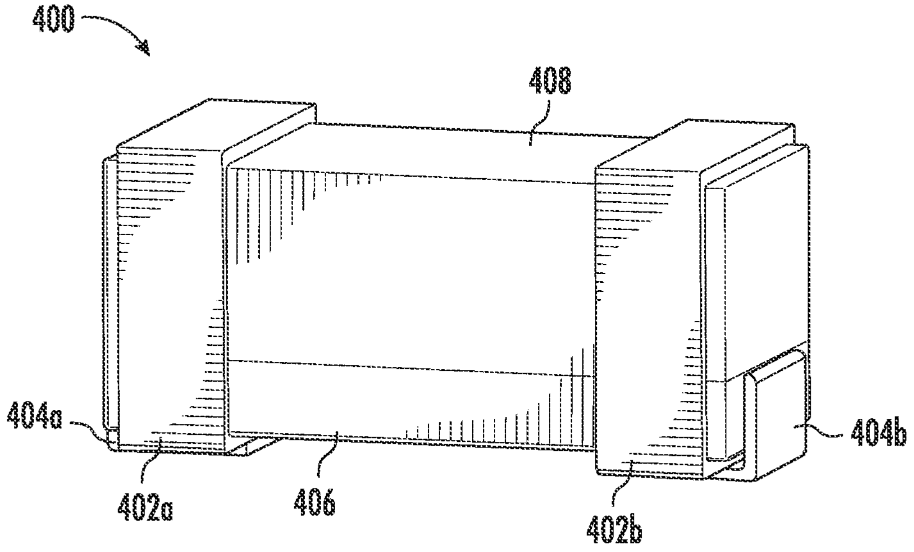

FIGS. 4A-4C are representative drawings of a fuse 400, according to exemplary embodiments. FIG. 4A is an exploded perspective view and FIGS. 4B-4C are perspective views of the fuse 400. In contrast to the fuse 100, the fuse 400 is a WIA fuse, but also features a two-piece split-body design with termination reinforcements. Rather than having a plurality of FR4 and epoxy layers, the two-piece split-body design consists of a bottom cover 406 and a top cover 408 which form the housing of the fuse, with a fusible element 410 sandwiched therebetween. In some embodiments, the bottom cover 406 and the top cover 408 are plastic. In other embodiments, the bottom cover 406 and top cover 408 are ceramic. In still other embodiments, the bottom cover 406 and top cover 408 consist of a combination of materials which may or may not include plastic or ceramic.

The fusible element 410 is connected at one end by a terminal 404*a* and at the other, opposite end by a terminal 404*b* (collectively, "terminal(s) 404"). In some embodiments, the terminals 404 are copper-tin (Cu—Sn) plated. In other embodiments, the terminals 404 are plated with brass metal, with copper flash, nickel plating, and a final tin-dipping layer. Tin dipping of the terminals 404 enables both electrical and mechanical contact between the termination reinforcements 402 and the terminals 404, thus creating a good connection therebetween, in some embodiments.

In contrast to the previous fuse designs, the fusible element 410 of the fuse 400 is wire wound, spiral, or coiled, although the fuse 400 may instead feature a single-wire, multiple-wire or other symmetrical or non-symmetrical shape. Further, the fusible element 410 is wrapped around a core 416 which is secured at either end by solder 414*a* and 414*b* (collectively, "solder 414"), where the solder terminals feature apertures having a circumference that is close to the circumference of the core 416. The solder 414 thus holds the core 416 and the wrapped around fusible element 410 in place. One end of the fusible element 410 is affixed to the terminal 404*a*, such as with soldering paste; similarly, a second, opposite end of the fusible element 410 is affixed to the terminal 404*b*.

In exemplary embodiments, the fuse 400 is further provided termination reinforcements 402*a* and 402*b* (collectively, "termination reinforcement(s) 402"), disposed at opposite ends of the fusible element 410. In exemplary embodiments, the termination reinforcements 402 consist of two metal rings. In FIGS. 4A and 4B, the terminals 404 are flat (horizontally disposed), whereas, in FIG. 4C, the terminals are twice "folded" such that they are "wrapped" around the bottom cover 406. In exemplary embodiments, the terminals 404 are C-shaped when bent into their final configuration.

After the fusible element 410 is affixed to the still flat terminals 404, the terminals are seated on the bottom cover 406 and the top cover 408 is thereafter attached to the bottom cover. At this stage, the terminals 404 are partially inside the housing and partially outside the housing. In one embodiment, the termination reinforcements 402 are inserted around the housing before the terminals 404 are folded. The terminals 404 are then folded so that a portion of each terminal is disposed underneath respective termination reinforcements 402 (see FIG. 4C).

In a second embodiment, the terminals 404 are folded around the assembly (e.g., top cover 408 and bottom cover 406) before the termination reinforcements 402 are inserted around the assembly (consisting of the top cover 408, the bottom cover 406, and the terminals 404) which is different from what is shown in FIG. 4C. The bottom portion of each termination 404 would thus be disposed "inside" the termination reinforcements 402, that is, between the termination reinforcements and the bottom cover 406.

Like the terminals 108 of the fuse 100 and the caps/C-clips of the fuse 200, the terminals 404 may be tin dipped to improve the volume of conductive joint for the fusible element 410, thus improving reliability of the fusible element connection to the terminals. The tin dip further facilitates good solder filler height after mounting.

Further, in some embodiments, the fuse 400 has a higher breaking capacity than a similarly configured two-piece plastic split-body fuse design. In exemplary embodiments, the fuse 400 has a breaking capacity of 10 kA@1000 VDC. Also, the fuse 400 has a higher $I^2t$ parameter than a similarly configured fuse having no termination reinforcements.

Figure 5A:
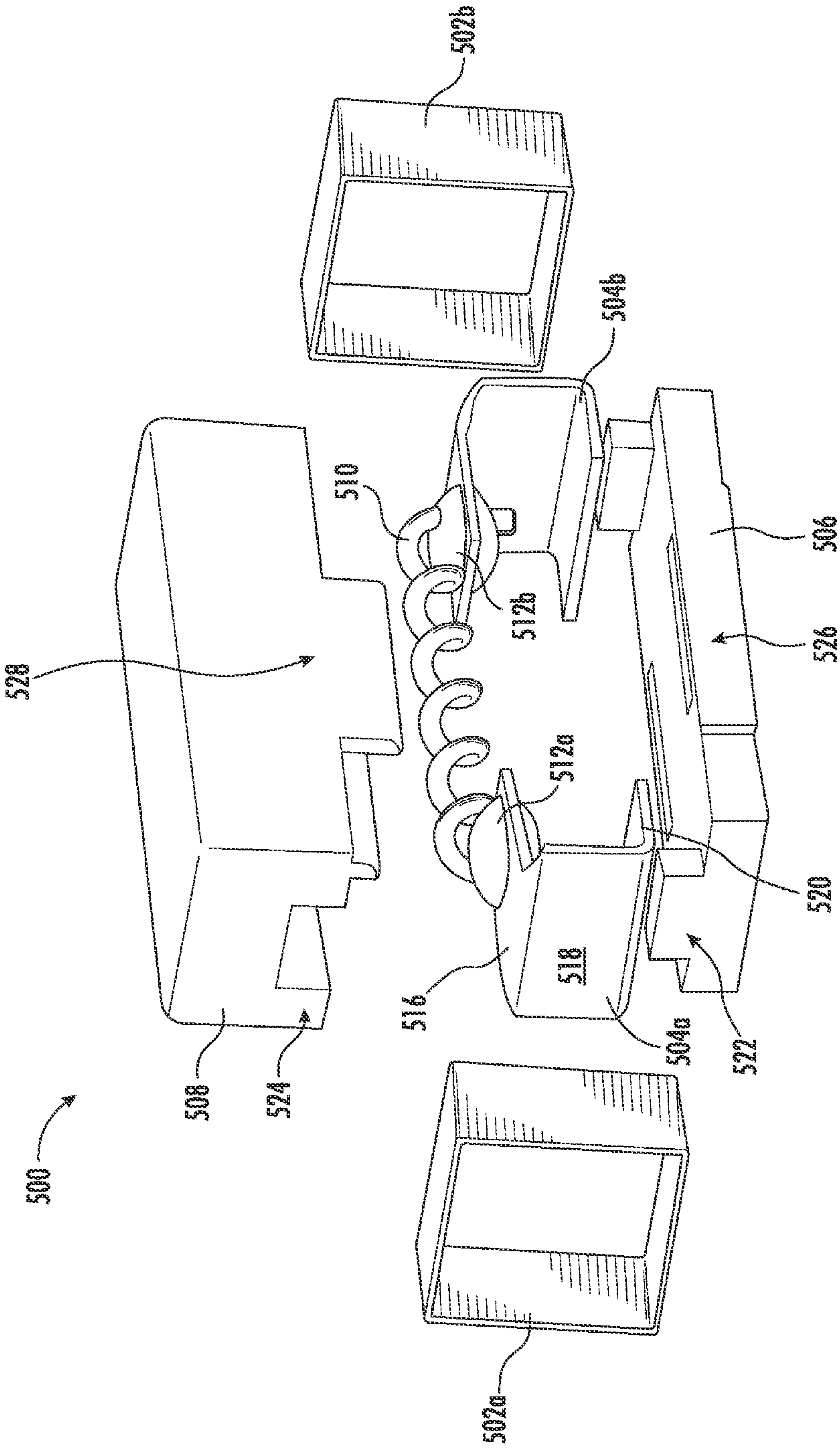
FIGS. 5A-5B are diagrams illustrating a high breaking capacity fuse, in accordance with exemplary embodiments.
Figure 5B:
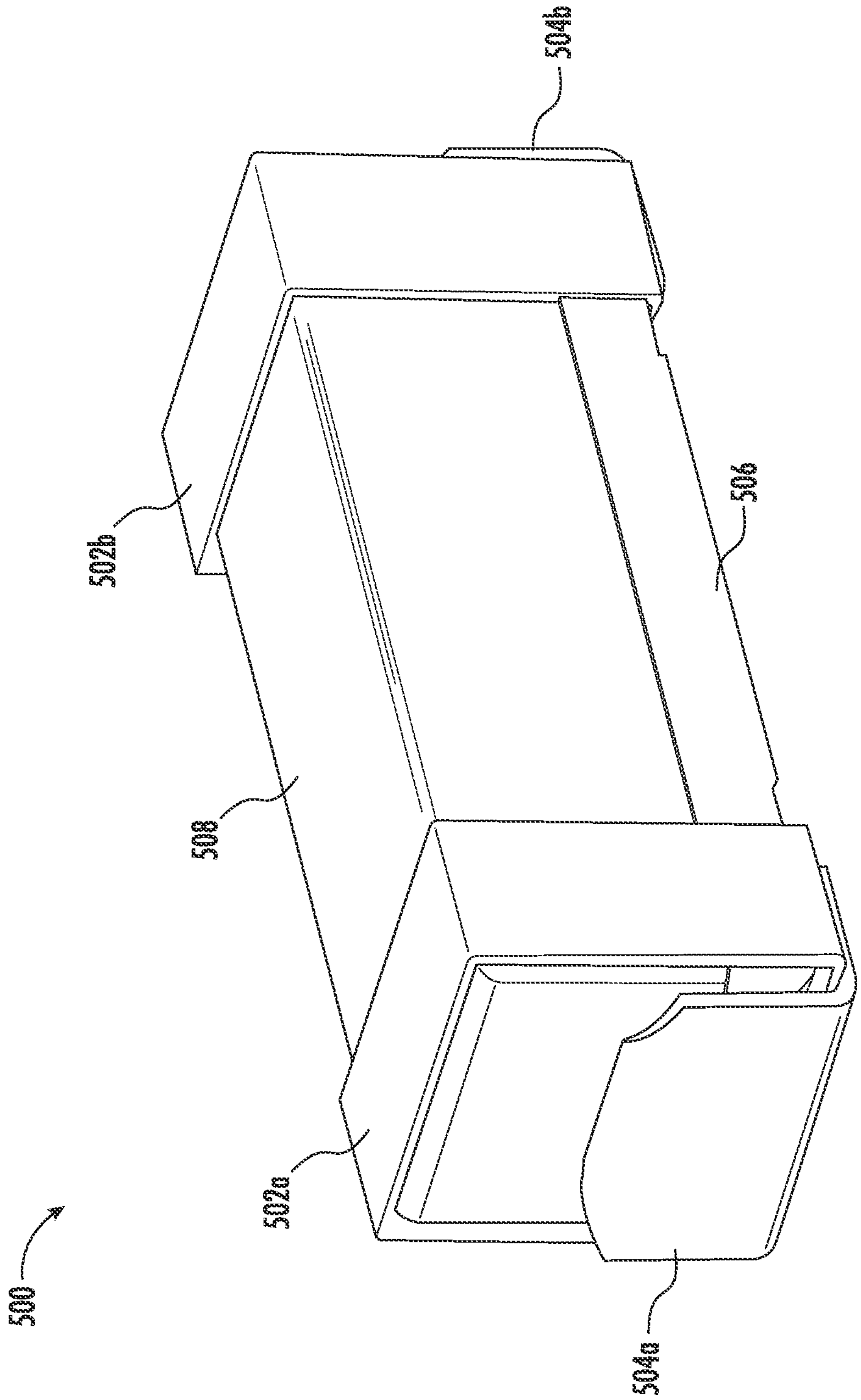

FIGS. 5A-5B are representative drawings of a fuse 500, according to exemplary embodiments. FIG. 5A is an exploded perspective view and FIG. 5B is a perspective view of the fuse 500. In exemplary embodiments, the fuse 500 is a surface mount type of fuse. Like the fuse 400, the fuse 500 is a WIA fuse, but also features a two-piece split-body design having termination reinforcement. The two-piece split-body design consists of a bottom cover 506 and a top cover 508 which form the housing of the fuse and inside which a fusible element 510 resides. In some embodiments, the bottom cover 506 and the top cover 508 are plastic. In other embodiments, the bottom cover 506 and top cover 508 are ceramic. In still other embodiments, the bottom cover 506 and top cover 508 consist of a combination of materials which may or may not include plastic or ceramic. The fusible element 510 is connected at one end by a terminal 504*a* and at the other, opposite end by a terminal 504*b* (collectively, "terminal(s) 504"). In some embodiments, the terminals 504 are copper-tin (Cu—Sn) plated. In other embodiments, the terminals 504 are plated with brass metal, with copper flash, nickel plating, and a final tin-dipping layer.

In contrast to the previous fuse designs, the fusible element 510 of the fuse 500 is coiled or wound wire, although the fuse 500 may instead feature a linear, single-wire or multiple-wire fusible element. Where the fusible element 510 is wound around a core (not shown), the core is removed before the bottom cover 506 and top cover 508 are secured to one another. One end of the fusible element 510 is affixed to the terminal 504*a* using soldering paste 512*a*; similarly, a second, opposite end of the fusible element 510 is affixed to the terminal 504*b* using soldering paste 512*b* (collectively, "soldering paste 512").

In exemplary embodiments, the fuse 500 is further provided termination reinforcement 502*a* and 502*b* (collectively, "termination reinforcement(s) 502"), disposed at opposite ends of the fusible element 510. In exemplary embodiments, the termination reinforcement 502 consists of a pair of closed metal rings as shown. In other embodiments, the termination reinforcement 502 consists of slotted metal rings or adhesive tape. Before describing the ways in which the termination reinforcements 502 are added to the fuse assembly, the terminals 504 are described in more detail.

Terminal 504*a* in FIG. 5A includes reference numbers to describe the shape of both terminals 504*a* and 504*b*. In exemplary embodiments, the terminals 504 are somewhat C-shaped, and, from the perspective of the illustration, a first portion 516 is horizontally disposed, a second portion 518 is vertically disposed, and a third portion 520 is horizontally disposed, such that the first portion 516 is parallel to the third portion 520 and the second portion 518 is orthogonal to the first and third portions.

Although C-shaped once assembled in the fuse 500, the terminals 504 are initially a flat metal structure that is twice bent into the C-shape, similar to that of terminals 404 in FIGS. 4A-4C. For example, the terminal 504*a* may be bent a first time so that top portion 516 is orthogonal to second portion 518, with third portion 520 being in the same plane as middle portion. The terminal 504*a* may then be bent a second time so that third portion 520 is orthogonal to second portion 518. The terminal 504 is thus bent a first time to form the first portion 516 and the second portion 518, with the first portion being orthogonal to the second portion. The terminal 504 is then bent a second time to form the third portion 520, such that the third portion is orthogonal to the second portion 518 and parallel to the first portion 516. The process of bending the terminal 504 may be done in reverse as well.

After the soldering paste 512 is applied to secure the fusible element 510 to the still flat terminals 504, the terminals are seated on the bottom cover 506 and the top cover 508 is attached to the bottom cover. At the terminal ends of the fuse 500, he bottom cover 506 includes protrusions 522 that fit inside openings 524 of the top cover 508, with one of each being indicated in FIG. 5A. The protrusions 522 and openings 524 help to align the first portion 516 of the terminals 504 before the top cover 508 and bottom cover 506 are secured to one another as the housing of the fuse 500. At the sides of the fuse 500, the top cover 508 includes extensions 528 that fit into slits 526 of the bottom cover 506, with one of each being indicated in FIG. 5A, to secure the top and bottom covers together.

At this stage, the terminals 504 are partially inside the housing and partially outside the housing. In one embodiment, the termination reinforcements 502 are inserted around the housing before the terminals 504 are folded. The terminals 504 are then folded so that the third portion 520 of each terminal 504 is disposed underneath respective termination reinforcements 502 (see FIG. 5B).

In a second embodiment, the terminals 504 are folded around the assembly (e.g., top cover 508 and bottom cover 506) before the termination reinforcements 502 are inserted around the assembly consisting of the top cover, the bottom cover, and the terminals, which is different from what is shown in FIG. 5B. The third portion 520 of each terminal 504 would be disposed "inside" the termination reinforcements 502, that is, between the termination reinforcements and the bottom cover 506.

Further, in some embodiments, the fuse 500 has a higher breaking capacity than a similarly configured two-piece plastic split-body fuse design. In exemplary embodiments, the fuse 500 has a breaking capacity of 10 kA@1000 VDC. Also, the fuse 500 can achieve a higher $I^2t$ parameter than a similarly configured fuse having no termination reinforcements.

Figure 6:
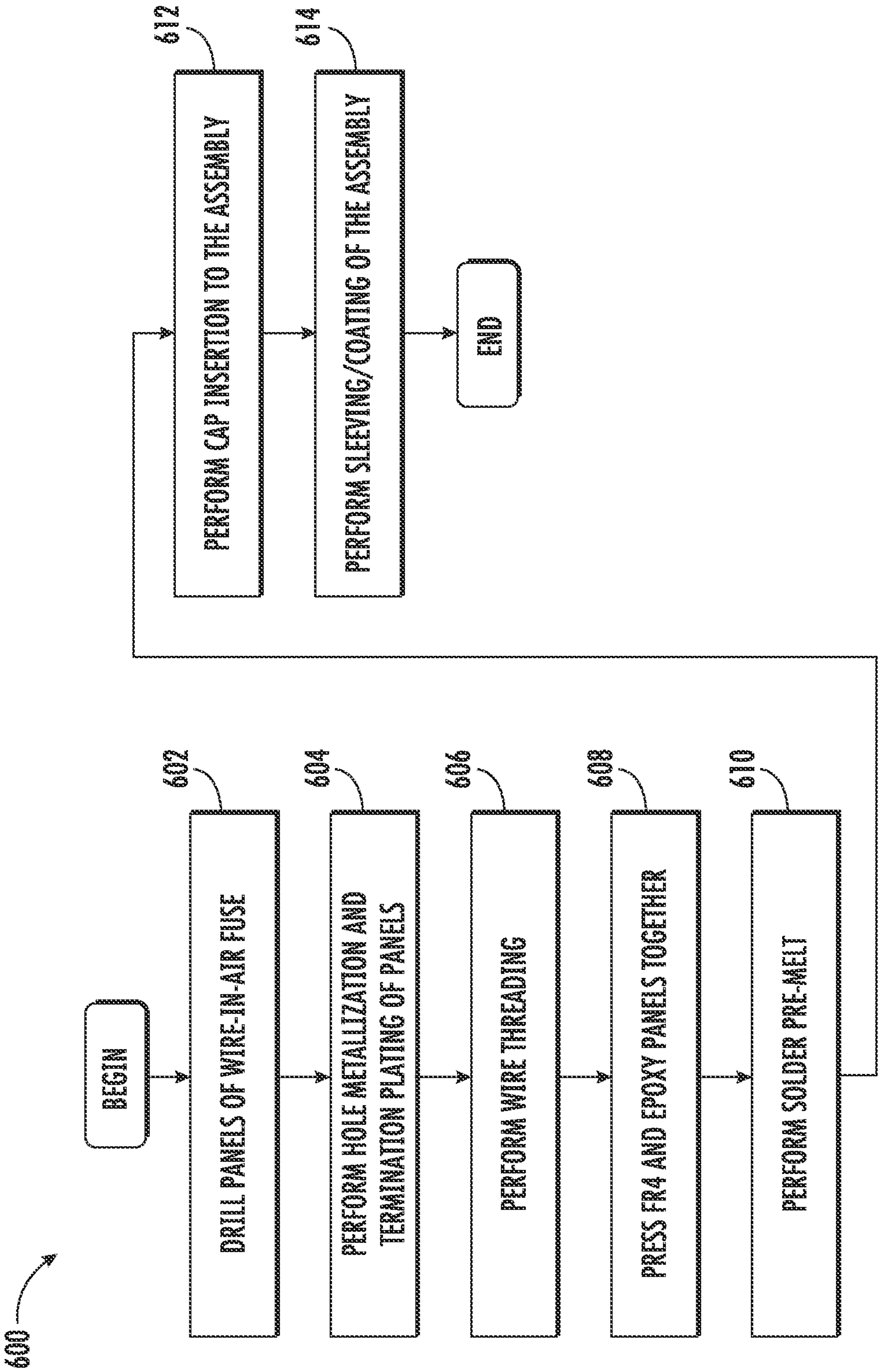
FIG. 6 is a flow diagram illustrating steps for manufacturing a high breaking capacity fuse, in accordance with exemplary embodiments.

FIG. 6 is a flow diagram describing process steps 600 for manufacturing the fuse 100, according to exemplary embodiments. The various FR4 layers 102 and epoxy layers 104 (panels) of the fuse 100 are drilled to meet the specification of the fuse (block 602). Hole metallization and termination plating of the panels is then performed (block 604). In the example of FIG. 1A, each of the layers 102 and 104 include three openings and two castellations. Next, a wire threading of the fusible element 106 is performed (block 606). In the example of FIG. 1A, the fusible element 106 would be located between the epoxy layer 104*c* and the epoxy layer 104*d*.

Next, the FR4 and epoxy layer panels are press-fit together (block 608). The epoxy layers are made of a material having an adhesive quality to facilitate this affixation. Once the layers are attached together, a fuse body is formed. A solder pre-melt is then performed (block 610) in preparation of the addition of the terminals. Cap insertion is next performed (block 612), in which the terminals and termination reinforcement are added to both ends of the fuse body. Optionally, the fuse body may additionally be sleeved or coated for further encapsulation of the fuse components (block 614).

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure refers to certain embodiments, numerous modifications, alterations, and changes to the described embodiments are possible without departing from the sphere and scope of the present disclosure, as defined in the appended claim(s). Accordingly, it is intended that the present disclosure is not limited to the described embodiments, but that it has the full scope defined by the language of the following claims, and equivalents thereof.

The invention claimed is:

1. A fuse comprising:

a fuse body comprising at least two portions;

a first terminal disposed at a first end of the fuse body;

a second terminal disposed at a second end of the fuse body, the second end being opposite the first end, wherein a fusible element is mechanically coupled to the first terminal and the second terminal; and a first termination reinforcement disposed at the first end of the fuse body, wherein the first termination reinforcement at least partially surrounds the at least two portions and the first terminal for preventing the at least two portions from coming apart during an abnormal event, and wherein the first termination reinforcement comprises a slotted metal ring with a slot positioned on a bottom thereof for receiving solder to secure the slotted metal ring to a printed circuit board.

2. The fuse of claim 1, wherein the fuse body is a wire-in-air assembly comprising a plurality of FR4 layers and a plurality of epoxy layers.

3. The fuse of claim 2, wherein the fuse body comprises castellations.

4. The fuse of claim 1, wherein the fuse body comprises a bottom cover and a top cover, and wherein the fusible element is sandwiched between the bottom cover and the top cover.

5. The fuse of claim 4, wherein the bottom cover and the top cover comprise plastic.

6. The fuse of claim 1, further comprising a second termination reinforcement disposed at the second end of the fuse body.

7. The fuse of claim 1, wherein the fusible element is a linear wire.

8. The fuse of claim 1, wherein the fusible element is a plurality of linear wires.

9. The fuse of claim 1, wherein the fusible element is a wire wrapped around a core.

10. The fuse of claim 1 wherein the fusible element is coiled.

11. A fuse comprising:

a fusible element disposed within a fuse body comprising a top cover and a bottom cover;

a terminal mechanically coupled to the fusible element, wherein the terminal is partially within and partially outside one side of the fuse body, wherein the terminal:

is bent a first time to form a first portion and a second portion, wherein the first portion is orthogonal to the second portion;

is bent a second time to form a third portion, wherein the third portion is orthogonal to the second portion and parallel to the first portion; and a termination reinforcement disposed at the first end of the fuse body, wherein the termination reinforcement at least partially surrounds the at least two portions and the terminal for preventing the at least two portions from coming apart during an abnormal event, wherein the termination reinforcement is in direct contact with the terminal, and wherein the termination reinforcement comprises a slotted metal ring with a slot positioned on a bottom thereof for receiving solder to secure the slotted metal ring to a printed circuit board (PCB).

12. The fuse of claim 11, wherein the termination reinforcement is disposed at the one side before the terminal is bent.

13. The fuse of claim 11, wherein the termination reinforcement is disposed at the one side after the terminal is bent.

14. The fuse of claim 11, wherein the fusible element is soldered to the terminal.

* * * * *